US012620683B2

(12) United States Patent
Chueh

(10) Patent No.: US 12,620,683 B2
(45) Date of Patent: May 5, 2026

(54) POWER DIVIDER

(71) Applicant: Nanning FuLian FuGui Precision Industrial Co., Ltd., Nanning (CN)

(72) Inventor: Yu-Chih Chueh, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 179 days.

(21) Appl. No.: 18/434,736

(22) Filed: Feb. 6, 2024

(65) Prior Publication Data

US 2025/0253511 A1 Aug. 7, 2025

(51) Int. Cl.
*H01P 1/18* (2006.01)
*H01P 5/16* (2006.01)

(52) U.S. Cl.
CPC ................ *H01P 1/184* (2013.01); *H01P 5/16* (2013.01)

(58) Field of Classification Search
CPC .................................. H01P 1/184; H01P 5/16
See application file for complete search history.

(56) References Cited

U.S. PATENT DOCUMENTS

| | | | | |
|---|---|---|---|---|
| 7,518,467 | B2 | 4/2009 | McKinley et al. | |
| 9,362,602 | B2 | 6/2016 | Darwish et al. | |
| 2017/0077892 | A1 * | 3/2017 | Thorup | H03H 7/48 |
| 2023/0369735 | A1 * | 11/2023 | Shigematsu | H03H 7/09 |

FOREIGN PATENT DOCUMENTS

| | | |
|---|---|---|
| CN | 108011168 | 5/2018 |
| CN | 214754095 U | 11/2021 |
| CN | 114512811 A | 5/2022 |

OTHER PUBLICATIONS

Schiffman, "A new class of broad band microwave 90 degree phase shifters" Apr. 1958, IRE Transaction on Microwave Theory and Techniques, vol. 6,Issue 2 pp. 232-237 (Year: 1958).*
Schiffman (Year: 1958).*

* cited by examiner

*Primary Examiner* — Andrea Lindgren Baltzell
*Assistant Examiner* — Kimberly E Glenn
(74) *Attorney, Agent, or Firm* — ScienBiziP, P.C.

(57) ABSTRACT

A power divider includes an input port, a first output port, a second output port, a first phase adjusting part, a second phase adjusting part, and a matching part, wherein: the first phase adjusting part is connected in series between the input port and the first output port, and is configured to adjust a phase of a first output signal output by the first output port; the second phase adjusting part is connected in series between the input port and the second output port, and is configured to adjust a phase of a second output signal output by the second output port; the matching part is connected in series between the first output port and the second output port, and is configured to match the first output port with the second output port; a phase difference between the first output signal and the second output signal is 180 degrees.

9 Claims, 6 Drawing Sheets

POWER DIVIDER

FIELD

The present disclosure relates to a field of microwave transmission technology, in particular to a power divider.

BACKGROUND

A power divider is a device that divides a power of an input signal into two or more outputs with equal or unequal power, and can also combine the power of multiple signals into one output. Power dividers with a 180 degree phase difference between the output ports are widely used in power combination, antenna feeding, etc. Common power dividers include 3 dB bridge couplers, branch line bridge couplers, ring bridge couplers, and Wilkinson power dividers. The most commonly used power divider is the Wilkinson power divider. In order to achieve a phase difference of 180 degrees between two output ports of the Wilkinson power divider, an external phase shifter is required, which will occupy a large PCB area and not meet requirements of equipment miniaturization.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
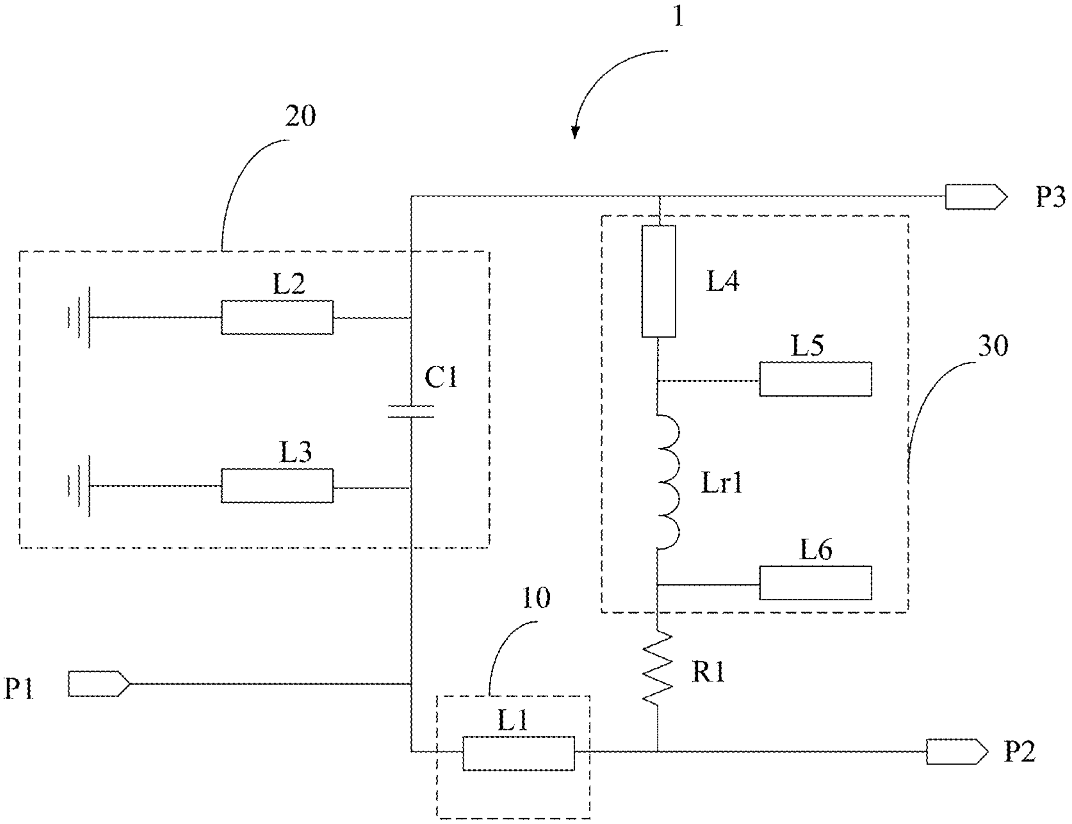
FIG. 1 is a schematic diagram of the circuit model of an embodiment of a power divider of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a schematic diagram of the circuit model of an embodiment of a power divider 1 of the present disclosure. In the embodiment, the power divider 1 can be applied to antenna arrays, balanced power amplifiers, mixers, and phase shifters. The power divider 1 divides an input signal into two signals with a phase difference of 180. Specifically, as shown in FIG. 1, the power divider 1 comprises an input port P1, a first output port P2, a second output port P3, a first phase adjusting part 10, a second phase adjusting part 20, and a matching part 30. The first phase adjusting part 10 is connected in series between the input port P1 and the first output port P2 to adjust a phase of a first output signal output by the first output port P2, so that the phase of the first output signal has a phase of −90 degrees. The second phase adjusting part 20 is connected in series between the input port P1 and the second output port P3 to adjust the phase of the second output signal output by the second output port P3, so that the second output signal has a phase of +90 degrees. By adjusting the phase through the first phase adjusting part 10 and the second phase adjusting part 20, a phase difference between the first output signal and the second output signal is 180 degrees. The matching part 30 is connected in series between the first output port P2 and the second output port P3, the matching part 30 is configured to match the first output port P2 and the second output port P3.

In the embodiment, the first phase adjusting part 10 comprises a first transmission line L1. The first transmission line L1 is electrically connected between the input port P1 and the first output port P2, and the phase of the first output signal is adjusted through the first transmission line L1 to cause the first output signal have a phase of −90 degrees. The second phase adjusting part 20 adjusts the phase of the second output signal to cause the second output signal have a phase of +90 degrees. Specifically, the second phase adjusting part 20 comprises a second transmission line L2, a first capacitor C1, and a third transmission line L3. One end of the second transmission line L2 is electrically connected to the second output port P3, and the other end of the second transmission line L2 is grounded. One end of the first capacitor C1 is electrically connected to the one end of the second transmission line L2, and the other end of the first capacitor C1 is electrically connected to the input port P1. One end of the third transmission line L3 is electrically connected to the other end of the first capacitor C1, and the other end of the third transmission line L3 is grounded.

In the embodiment, the matching part 30 comprises a fourth transmission line L4, a first inductor Lr1, a first residual segment L5, and a second residual segment L6. One end of the fourth transmission line L4 is electrically connected to the second output port P3. One end of the first inductor Lr1 is electrically connected to the other end of the fourth transmission line L4, and the other end of the first inductor Lr1 is electrically connected to the first output port P2. One end of the first residual segment L5 is electrically connected to a common end of the fourth transmission line L4 and the first inductor Lr1, and the other end of the first residual segment L5 is suspended. One end of the second residual segment L6 is electrically connected to the other end of the first inductor Lr1, and the other end of the second residual segment L6 is suspended. A matching degree between the first output port P2 and the second output port P3 is adjusted by adjusting an inductance value of the first inductor Lr1.

In the embodiment, the power divider 1 further comprises a first resistor R1. One end of the first resistor R1 is electrically connected to the other end of the first inductor Lr1, and the other end of the first resistor R1 is electrically connected to the first output port P2. The first resistor R1 is configured to adjust an isolation degree between the first output port P2 and the second output port P3.

Figure 2:
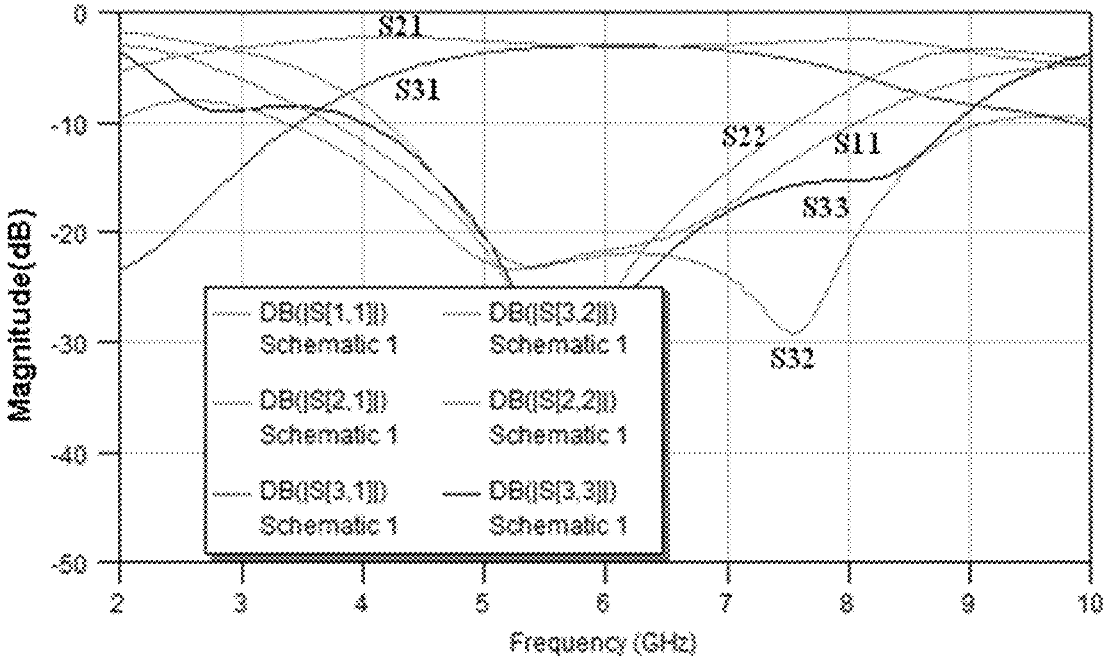
FIG. 2 is a simulation diagram of S-parameters of an embodiment of the power divider of the present disclosure.

Referring to FIG. 2, FIG. 2 is a simulation diagram of S-parameters of an embodiment of the power divider 1 of the present disclosure. As shown in FIG. 2, according to S21 and S31 parameter curves, the power divider 1 can achieve better half power distribution at the first output P2 and second output P3 when operating in a frequency band of 6 GHz. According to the S11, S22 and S33 parameter curves, reflection coefficients of the input port P1, first output port P2, and second output port P3 are all above 15 dB. According to the S32 parameter curve, the isolation degree between the first output port P2 and the second output port P3 reaches over 20 dB.

Figure 3:
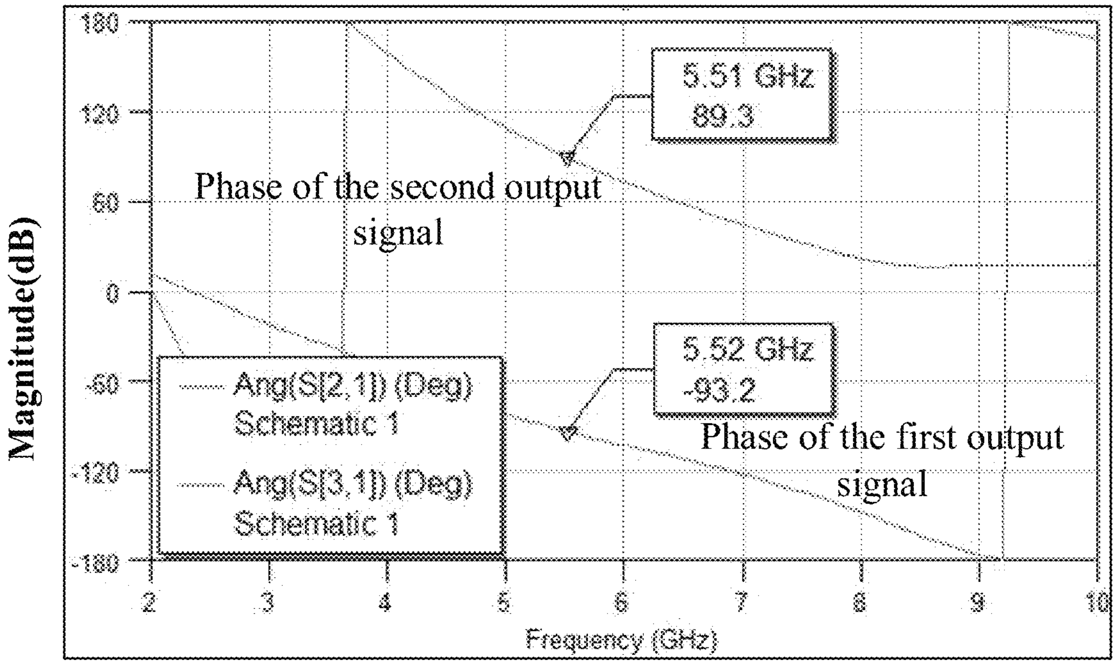
FIG. 3 is a phase schematic diagram of a first output signal and a second output signal of an embodiment of the power divider of the present disclosure.

Referring to FIG. 3, FIG. 3 is a phase schematic diagram of the first output signal and the second output signal of an embodiment of the power divider 1 of the present disclosure. As shown in FIG. 3, at a frequency of 5.52 GHz, a phase of the first output signal is −93.2 degrees. At a frequency of 5.51 GHz, the phase of the second output signal is +89.3 degrees. The phase difference between the first output signal and the second output signal is about 180 degrees, which meets the phase difference requirements between the first output port P2 and the second output port P3.

Figure 4:
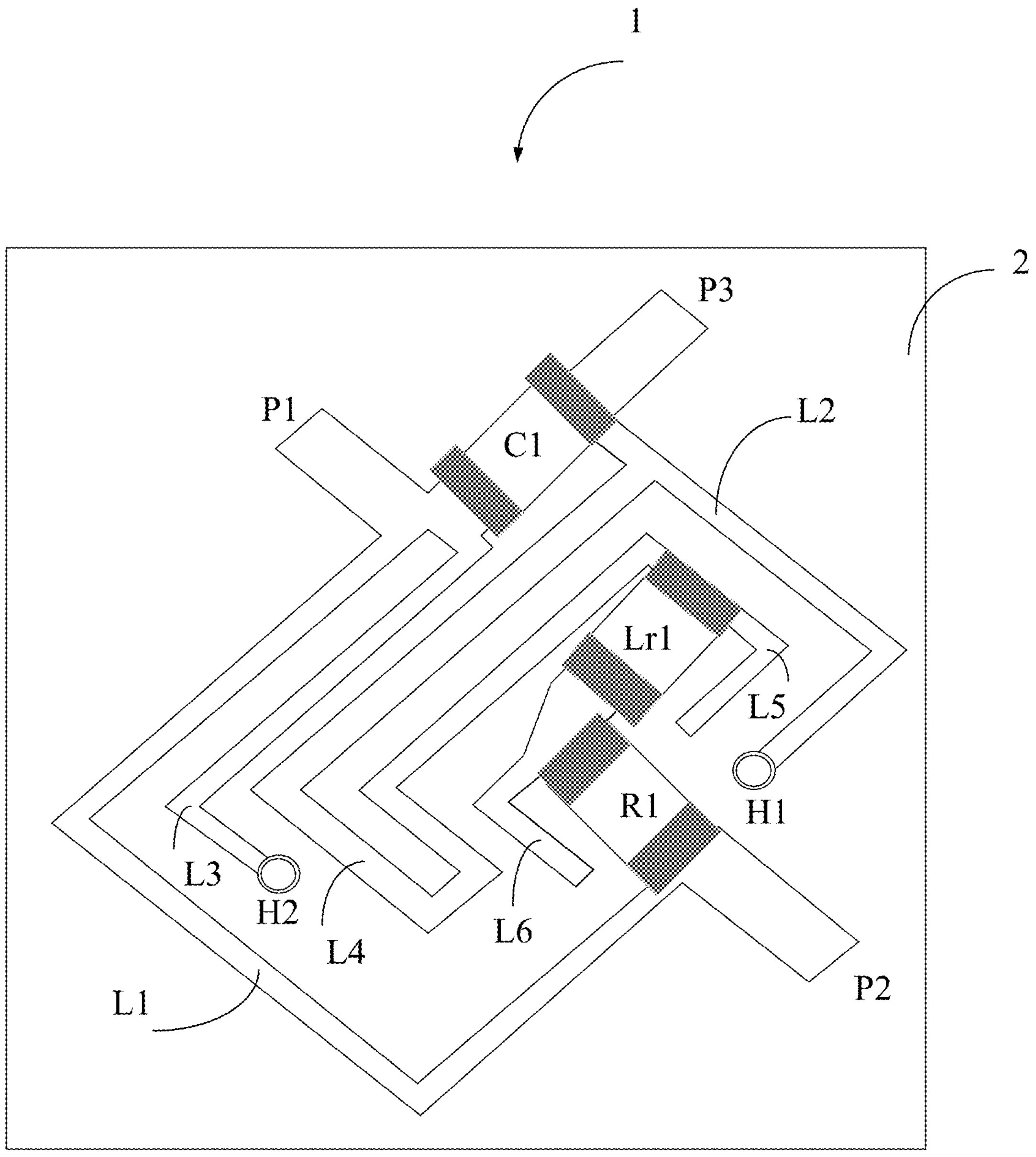
FIG. 4 is a schematic diagram of a structure of a specific embodiment of the power divider of the present disclosure.

Referring to FIG. 4, FIG. 4 is a schematic diagram of a structure of a specific embodiment of the power divider 1 of the present disclosure. In the embodiment, the power divider 1 is integrated on a printed circuit board 2. The printed circuit board 2 comprises a first side and a second side. The input port P1, the first output port P2, the second output port P3, the first phase adjusting part 10, the second phase adjusting part 20, and the matching segment 30 are set on the first side of the printed circuit board 2, and the second side of the printed circuit board 2 is a ground plane.

In the embodiment, the first output port P2 and the second output port P3 are perpendicular to each other. The input port P1 is parallel to the first output port P2, and the input port P1 is perpendicular to the second output port P3. The first transmission line L1 is in a Π shape, and one end of the first transmission line L1 is vertically connected to the first output port P2 and the other end of the first transmission line L1 is vertically connected to the input port P1. The second transmission line L2 is in a ⌋ shape, one end of the second transmission line L2 is vertically connected to the second output port P3 and the other end of the second transmission line L2 is connected to the ground plane through a first through-hole H1. The third transmission line L3 is in a ⌈ shape, one end of the third transmission line L3 is connected to the other end of the first capacitor C1 and the other end of the third transmission line L3 is connected to the ground plane through a second through-hole H2, the second transmission line L2 and the third transmission line L3 form a semi enclosed storage space.

In the embodiment, the matching part 30 is set in the semi enclosed storage space. Specifically, the fourth transmission line L4 is in a bent shape, one end of the fourth transmission line L4 is vertically connected to the second transmission line L2, and the other end of the fourth transmission line L4 is connected to the one end of the first inductor Lr1. The first residual segment L5 is in a ⌋ shape, one end of the first residual segment L5 is connected to a common end of the fourth transmission line L4 and the first inductor Lr1, and the other end of the first residual segment L5 is suspended. The second residual segment L6 is in a ⌈ shape, one end of the second residual segment L6 is electrically connected to the other end of the first inductor Lr1, and the other end of the second residual segment L6 is suspended. In the embodiment, a length of power divider 1 is 5.06 mm and a width is 3.52 mm. In other embodiments, the length and width of power divider 1 can be other values.

Figure 5:
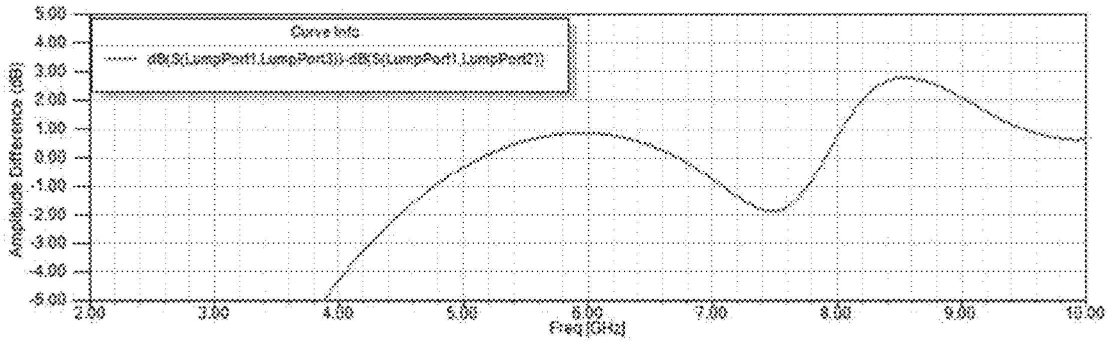
FIG. 5 is a schematic diagram of an output power difference between a first output port and a second output port of a specific embodiment of the power divider of the present disclosure.

Referring to FIG. 5, FIG. 5 is a schematic diagram of an output power difference between the first output port P2 and the second output port P3 of a specific embodiment of the power divider 1 of the present disclosure. As shown in FIG. 5, within an operating frequency range of 4.5 GHz to 8.2 GHz, an error value of the output power of the first output port P2 and the second output port P3 is within ±2 dB.

Figure 6:
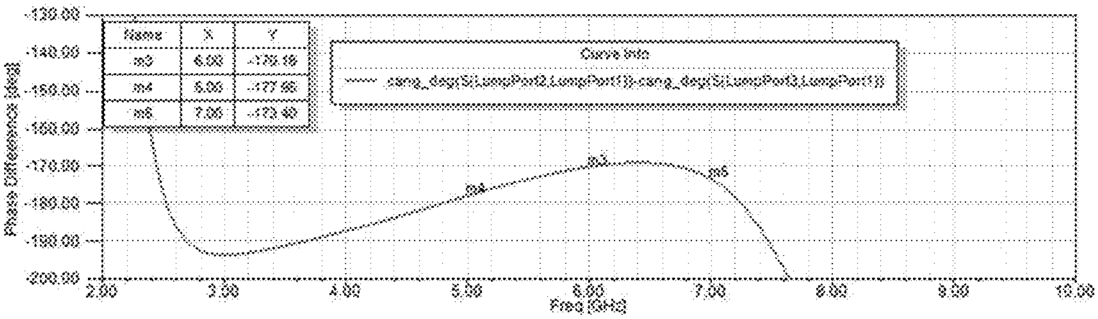
FIG. 6 is a schematic diagram of the phase difference between the first output signal and the second output signal of a specific embodiment of the power divider of the present disclosure.

Referring to FIG. 6, FIG. 6 is a schematic diagram of the phase difference between the first output signal and the second output signal of a specific embodiment of the power divider 1 of the present disclosure. As shown in FIG. 6, within an operating frequency range of 3.6 GHz to 7.4 GHz, the phase difference between the first output signal and the second output signal is 180±10 degrees, which meets the phase difference requirements between the first output port P2 and the second output port P3.

Compared with the prior art, the power divider provided by the present embodiment is provided with a first phase adjusting segment between the input port and the first output port to adjust the phase of the first output signal output by the first output port, and a second phase adjusting segment between the input port and the second output port to adjust the phase of the second output signal output by the second output port, so that the phase difference between the first output signal and the second output signal is 180 degrees. The power divider provided by the embodiment method of the present disclosure does not require additional phase shifters, has a relatively simple structure, reduces the area of the printed circuit board, and meets the requirements of miniaturization.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power divider, comprising an input port, a first output port, a second output port, a first phase adjusting part, a second phase adjusting part, and a matching part, wherein:

the first phase adjusting part is connected in series between the input port and the first output port, and is configured to adjust a phase of a first output signal output by the first output port;

the second phase adjusting part is connected in series between the input port and the second output port, and is configured to adjust a phase of a second output signal output by the second output port;

the matching part is connected in series between the first output port and the second output port, and is configured to match the first output port with the second output port;

a phase difference between the first output signal and the second output signal is 180 degrees;

wherein the matching part comprises:

a fourth transmission line, one end of the fourth transmission line is electrically connected to the second output port;

a first inductor, one end of the first inductor is electrically connected to the other end of the fourth transmission line, and the other end of the first inductor is electrically connected to the first output port;

a first residual segment, one end of the first residual segment is electrically connected to a common end of the fourth transmission line and the first inductor, and the other end of the first residual segment is suspended;

a second residual segment, one end of the second residual is electrically connected to the other end of the first inductor, and the other end of the second residual segment is suspended.

2. The power divider according to claim 1, wherein the first phase adjusting part comprises:

a first transmission line, electrically connected between the input port and the first output port, and configured to adjust the phase of the first output signal, to cause the first output signal to have a phase of −90 degrees.

3. The power divider according to claim 2, wherein the second phase adjusting part is configured to adjust the phase of the second adjusting part to cause the second output signal to have a phase of +90 degrees, and the second phase adjusting part comprises:

a second transmission line, one end of the second transmission line is electrically connected to the second output port, and the other end of the second transmission line is grounded;

a first capacitor, one end of the first capacitor is electrically connected to the one end of the second transmission line, and the other end of the first capacitor is electrically connected to the input end;

a third transmission line, one end of the third transmission is electrically connected to the other end of the first capacitor, and the other end of the third transmission is grounded.

4. The power divider according to claim 1, wherein a matching degree between the first output port and the second output port is adjusted by adjusting an inductance value of the first inductor.

5. The power divider according to claim 1, further comprising:

a first resistor, one end of the first resistor is electrically connected to the other end of the first inductor, the other end of the first resistor is electrically connected to the first output port, and the first resistor is configured to adjust an isolation degree between the first output port and the second output port.

6. The power divider according to claim 5, wherein:

the power divider is integrated on a printed circuit board;

the input port, the first output port, the second output port, the first phase adjusting part, the second phase adjusting part, and the matching part are set on a first side of the printed circuit board, and a second side of the printed circuit board is a ground plane.

7. The power divider according to claim 6, wherein:

the first output port and the second output port are perpendicular to each other;

the input port is parallel to the first output port, and the input port is perpendicular to the second output port;

the first transmission line is in a II shape, and one end of the first transmission line is vertically connected to the first output port and the other end of the first transmission line is vertically connected to the input port.

8. The power divider according to claim 7, wherein:

the second transmission line is in a ⌋ shape, one end of the second transmission line is vertically connected to the second output port and the other end of the second transmission line is connected to the ground plane through a first through-hole;

the third transmission line is in a ⌈ shape, one end of the third transmission line is connected to the other end of the first capacitor and the other end of the third transmission line is connected to the ground plane through a second through-hole, the second transmission line and the third transmission line form a semi enclosed storage space.

9. The power divider according to claim 8, wherein:

the matching part is set in the semi enclosed storage space;

the fourth transmission line is in a bent shape, one end of the fourth transmission line is vertically connected to the second transmission line and the other end of the fourth transmission line is connected to the one end of the first inductor;

the first residual segment is in ⌋ shape, one end of the first residual segment is connected to a common end of the fourth transmission line and the first inductor, and the other end of the first residual segment is suspended;

the second residual segment is in a ⌈ shape, one end of the second residual segment is electrically connected to the other end of the first inductor, and the other end of the second residual segment is suspended.

* * * * *